US011365640B2

(12) United States Patent
Davis

(10) Patent No.: US 11,365,640 B2
(45) Date of Patent: Jun. 21, 2022

(54) SEAL ASSEMBLY WITH ANTI-ROTATION LOCK

(71) Applicant: United Technologies Corporation, Farmington, CT (US)

(72) Inventor: Michael M. Davis, North Granby, CT (US)

(73) Assignee: Raytheon Technologies Corporation

( * ) Notice: Subject to any disclaimer, the term of this patent is extended or adjusted under 35 U.S.C. 154(b) by 124 days.

(21) Appl. No.: 16/576,206

(22) Filed: Sep. 19, 2019

(65) Prior Publication Data

US 2021/0087941 A1  Mar. 25, 2021

(51) Int. Cl.
F16J 15/34 (2006.01)
F01D 11/00 (2006.01)

(52) U.S. Cl.
CPC .......... F01D 11/003 (2013.01); F16J 15/348 (2013.01)

(58) Field of Classification Search
CPC ...... F01D 11/003; F16J 15/34; F16J 15/3464; F16J 15/3472; F16J 15/348
See application file for complete search history.

(56) References Cited

U.S. PATENT DOCUMENTS

| | | | |
|---|---|---|---|
| 2,672,357 A * | 3/1954 | Voytech | F16J 15/38 277/369 |
| 4,406,466 A | 9/1983 | Geary, Jr. | |
| 5,333,882 A * | 8/1994 | Azibert | F16J 15/3448 277/367 |
| 6,131,913 A * | 10/2000 | Auber | F16J 15/3464 277/372 |
| 7,648,143 B2 | 1/2010 | Davis | |
| 8,899,593 B2 | 12/2014 | Jahn | |
| 9,127,557 B2 | 9/2015 | Davis, III | |
| 9,291,269 B2 | 3/2016 | Jahn | |
| 9,982,553 B2 | 5/2018 | Miller | |
| 10,024,241 B2 | 7/2018 | Miller | |
| 10,208,610 B2 | 2/2019 | Miller | |
| 2002/0093141 A1 | 7/2002 | Wang | |
| 2007/0085278 A1 | 4/2007 | Davis | |
| 2014/0049009 A1 | 2/2014 | Jahn | |
| 2014/0265151 A1 | 9/2014 | Vasagar | |

FOREIGN PATENT DOCUMENTS

EP  0345944 B1  9/1993

OTHER PUBLICATIONS

EP search report for EP20194952.6 dated Jan. 29, 2021.

* cited by examiner

*Primary Examiner* — Gilbert Y Lee
(74) *Attorney, Agent, or Firm* — Getz Balich LLC

(57) ABSTRACT

An assembly is provided for rotational equipment. This assembly includes a stationary structure, a rotating structure, a seal element and an anti-rotation lock. The rotating structure is rotatable about an axis. The rotating structure is configured as or otherwise includes a seal land. The seal element is configured to seal a gap between the stationary structure and the seal land. The seal element extends circumferentially about the axis. The seal element axially contacts the seal land. The anti-rotation lock projects radially into the stationary structure and the seal element. The anti-rotation lock is configured to at least substantially prevent rotation of the seal element relative to the stationary structure.

12 Claims, 13 Drawing Sheets

SEAL ASSEMBLY WITH ANTI-ROTATION LOCK

BACKGROUND OF THE DISCLOSURE

1. Technical Field

This disclosure relates generally to rotational equipment and, more particularly, to a seal assembly for sealing a gap between a rotating component and a stationary component.

2. Background Information

A gas turbine engine typically includes various seal assemblies for sealing gaps between stationary components and rotating components. Various types of seal assemblies are known in the art. While these known seal assemblies have various advantages, there is still room in the art for improvement. There is a need in the art therefore for improved seal assemblies.

SUMMARY OF THE DISCLOSURE

According to an aspect of the present disclosure, an assembly is provided for rotational equipment. This assembly includes a stationary structure, a rotating structure, a seal element and an anti-rotation lock. The rotating structure is rotatable about an axis. The rotating structure is configured as or otherwise includes a seal land. The seal element is configured to seal a gap between the stationary structure and the seal land. The seal element extends circumferentially about the axis. The seal element axially contacts the seal land. The anti-rotation lock projects radially into the stationary structure and the seal element. The anti-rotation lock is configured to at least substantially prevent rotation of the seal element relative to the stationary structure.

According to another aspect of the present disclosure, another assembly is provided for rotational equipment. This assembly includes a stationary structure, a rotating structure, a first seal element, a second seal element and an anti-rotation lock. The rotating structure is rotatable about an axis. The rotating structure includes a first seal land and a second seal land. The first seal element is configured to seal a gap between the stationary structure and the first seal land. The first seal element axially sealingly engages the first seal land. The second seal element is configured to seal a gap between the stationary structure and the second seal land. The second seal element axially sealingly engages the second seal land. The anti-rotation lock is configured to at least substantially prevent rotation of the first seal element and the second seal element about the axis.

The anti-rotation lock may extend radially into the stationary structure, the first seal element and the second seal element.

The anti-rotation lock may be configured as or otherwise include a key. The key may be arranged in a first channel and a second channel. The first channel may extend axially into the first seal element. The second channel may extend axially into the second seal element.

The anti-rotation lock may be further configured to enable axial movement of the first seal element and/or the second seal element along the axis.

The assembly may also include a spring element arranged between the first seal element and the second seal element. The spring element may be configured to bias the first seal element against the first seal land. The spring element may also be configured to bias the second seal element against the second seal land.

The anti-rotation lock may be configured as or otherwise include a key. The key may be arranged in a channel that extends axially through the seal element.

The key may project axially into a second gap formed by and radially between the seal element and the stationary structure.

The seal element may extend circumferentially about the axis between opposing side surfaces. The anti-rotation lock may bridge a gap formed between the side surfaces.

The anti-rotation lock may be configured as or otherwise include a pin.

An inner portion of the pin may project radially into an aperture in the seal element. An outer portion of the pin may project radially into a slot in the stationary structure.

The anti-rotation lock may be further configured to enable axial movement of the seal element relative to the stationary structure.

The seal element may radially contact the stationary structure.

The seal element may be configured as or otherwise include an annular carbon seal element.

The assembly may include a spring element configured to bias the seal element axially against the seal land.

The assembly may include a second seal element configured to seal a gap between the stationary structure and a second seal land. The second seal element may extend circumferentially about the axis. The second seal element may axially contact the second seal land.

The assembly may include a spring element arranged axially between the seal element and the second seal element. The spring element may be configured to bias the seal element axially against the seal land. The spring element may be further configured to bias the second seal element axially against the second seal land.

The anti-rotation lock may be further configured to at least substantially prevent rotation of the second seal element relative to the stationary structure.

The anti-rotation lock may further project radially into the second seal element.

The assembly may include a second anti-rotation lock projecting radially into the stationary structure and the second seal element. The second anti-rotation lock may be configured to at least substantially prevent rotation of the second seal element relative to the stationary structure.

The foregoing features and the operation of the invention will become more apparent in light of the following description and the accompanying drawings.

DETAILED DESCRIPTION

Figure 1:
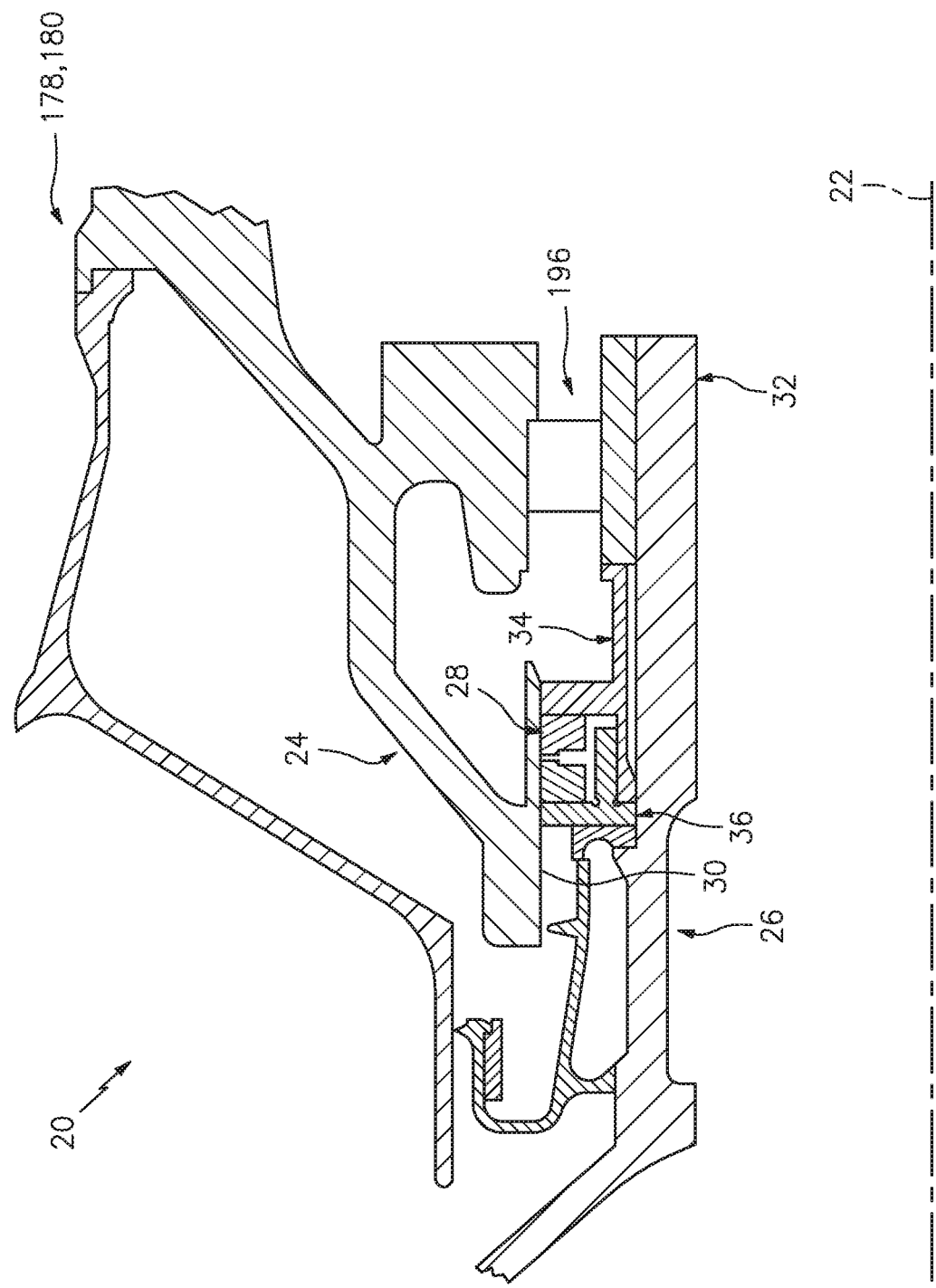
FIG. 1 is a partial side sectional illustration of an assembly for rotational equipment.

FIG. 1 illustrates an assembly 20 for rotational equipment with an axial centerline 22, which axial centerline 22 may also be an axis of rotation (e.g., a rotational axis) for one or more components of the assembly 20. An example of such rotational equipment is a gas turbine engine for an aircraft propulsion system, an exemplary embodiment of which is described below in further detail. However, the assembly 20 of the present disclosure is not limited to such an aircraft application nor a gas turbine engine application. The assembly 20, for example, may alternatively be configured with rotational equipment such as an industrial gas turbine engine, a wind turbine, a water turbine or any other apparatus in which a seal is provided between a stationary structure and a rotating structure; e.g., a rotor.

The assembly 20 of FIG. 1 includes a stationary structure 24, a rotating structure 26 and a seal assembly 28; e.g., a carbon seal assembly. The seal assembly 28 is configured to seal an annular gap between the stationary structure 24 and the rotating structure 26 as described below in further detail.

The stationary structure 24 has a stationary structure inner surface 30. This inner surface 30 may be substantially cylindrical. The inner surface 30 extends circumferentially around and faces towards the axial centerline 22. The inner surface 30 at least partially forms a bore in the stationary structure 24. This bore is sized to receive the seal assembly 28, which seal assembly 28 is fixedly mounted to the stationary structure 24 as described below in further detail.

The rotating structure 26 includes a shaft 32 and one or more seal lands 34 and 36. Each of these seal lands 34 and 36 may be configured as a discrete, unitary (e.g., annular) body as shown in FIG. 1. In such embodiments, each of the seal lands 34 and 36 is mounted directly or indirectly on the shaft 32 and is thereby rotatable with the shaft 32 about the axial centerline 22; e.g., the rotational axis of the rotating structure 26. Alternatively, one or each of the seal lands 34 and 36 may be configured with another component/portion of the rotating structure 26. For example, at least one of the seal lands 34, 36 (e.g., the first seal land 34) may be formed as an integral portion of the shaft 32 or another component mounted to the shaft 32.

Figure 2:
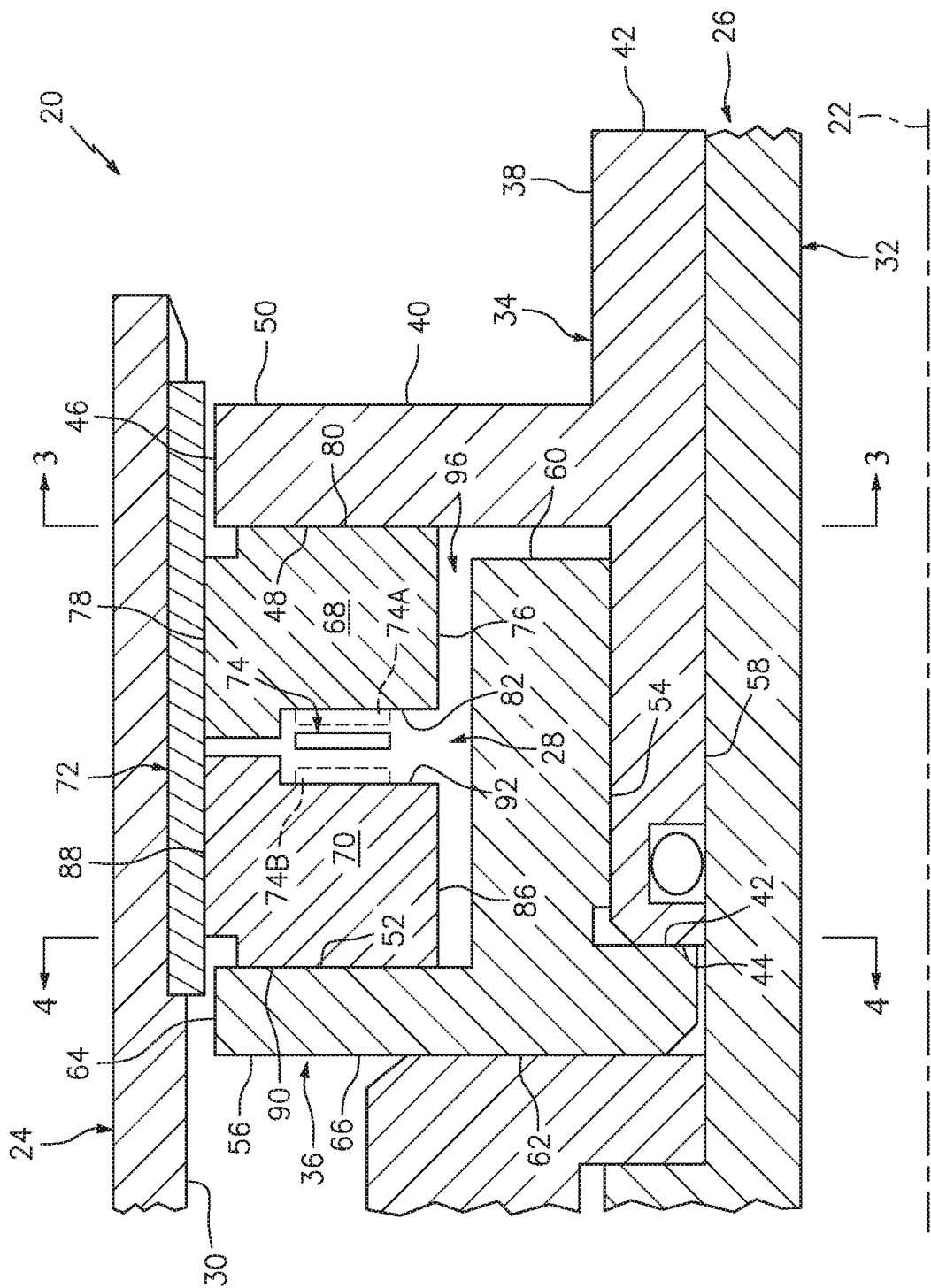
FIG. 2 is a partial side sectional illustration of a seal assembly between a stationary structure and a rotating structure.

The first seal land 34 of FIG. 2 may be configured as an annular full-hoop body. The first seal land 34, for example, extends circumferentially about (e.g., completely around) the axial centerline 22; e.g., see FIG. 3. The first seal land 34 of FIG. 2 includes a tubular first base 38 and an annular first flange 40. The first base 38 is mounted (e.g., directly) on the shaft 32 and extends axially along the axial centerline 22 between opposing first seal land ends 42 and 44. The first flange 40 is disposed (e.g., about midway) axially between the first seal land ends 42 and 44. The first flange 40 projects radially out from the first base 38 to a distal flange end 46. The first flange 40 extends axially along the axial centerline 22 between a first seal land surface 48 and another surface 50 opposite the first seal land surface 48; e.g., a first seal land back surface.

Figure 3:
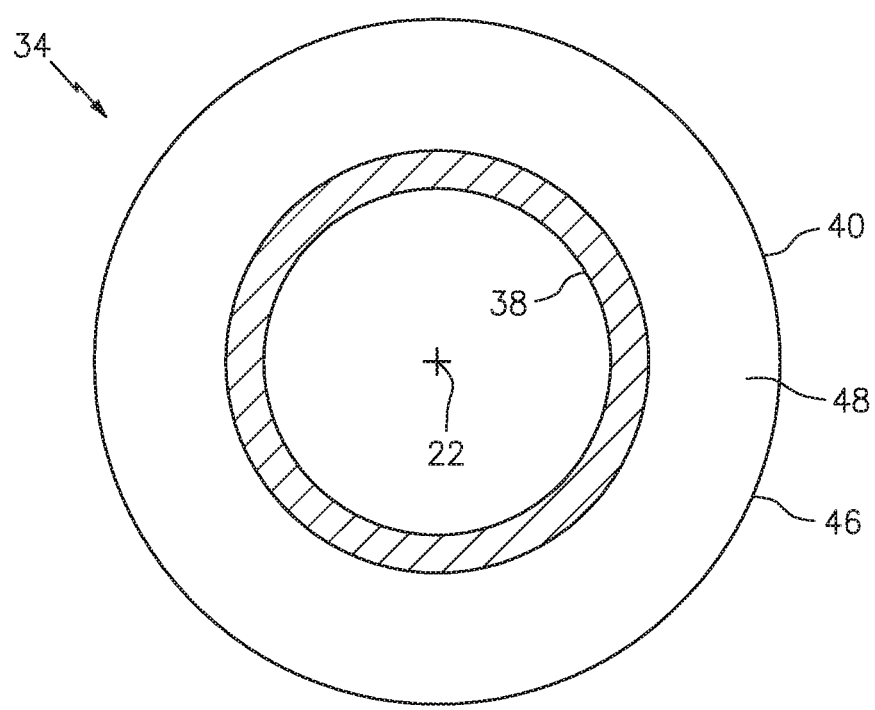
FIG. 3 is a cross-sectional illustration of a first seal land taken along line 3-3 in FIG. 2.

The first seal land surface 48 is a radially extending surface, which may be exactly or substantially (e.g., within +/−1 degree) perpendicular to the axial centerline 22. The first seal land surface 48 may be circumferentially and/or radially uninterrupted. The first seal land surface 48 of FIG. 3, for example, extends circumferentially around the axial centerline 22 and/or radially between opposing edges of the first seal land surface 48 without any breaks; e.g., apertures and/or protrusions. The present disclosure, of course, is not limited to such an exemplary first seal land surface 48. For example, in other embodiments, the first seal land surface 48 may be circumferentially and/or radially interrupted by one or more apertures; e.g., grooves, ports, etc. The first seal land surface 48 of FIGS. 2 and 3 is an annular, planar (e.g., flat) surface. The first seal land surface 48 of FIG. 2 axially faces the second seal land 36 and its second seal land surface 52.

The second seal land 36 of FIG. 2 may be configured as an annular full-hoop body. The second seal land 36, for example, extends circumferentially about (e.g., completely around) the axial centerline 22; e.g., see FIG. 4. The second seal land 36 of FIG. 2 includes a tubular second base 54 and an annular second flange 56. The second base 54 is mounted (e.g., indirectly) on the shaft 32. The second base 54 of FIG. 2, for example, includes a counterbore which receives an axial portion 58 of the first base 38. The second base 54 is mounted (e.g., directly) on the first base 38 and is thereby indirectly mounted on the shaft 32 through the first seal land 34. The second base 54 extends axially along the axial centerline 22 between opposing second seal land ends 60 and 62. The second flange 56 is disposed at the second seal land end 62. The second flange 56 projects radially out from the second base 54 to a distal flange end 64. The second flange 56 extends axially along the axial centerline 22 between the second seal land surface 52 and another surface 66 opposite the second seal land surface 52; e.g., a second seal land back surface.

Figure 4:
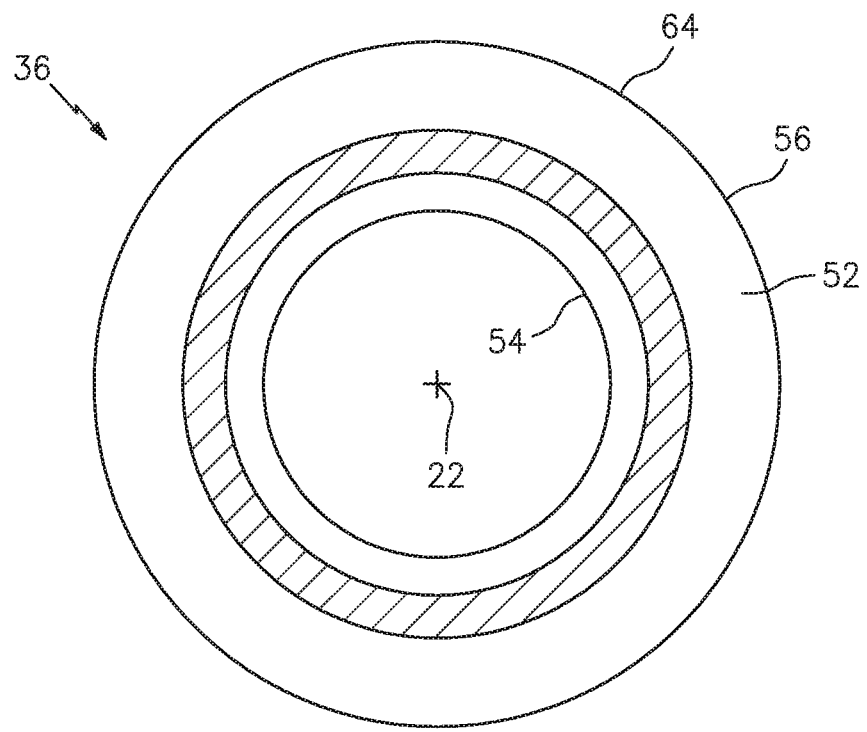
FIG. 4 is a cross-sectional illustration of a second seal land taken along line 4-4 in FIG. 2.

The second seal land surface 52 is a radially extending surface, which may be exactly or substantially (e.g., within +/−1 degree) perpendicular to the axial centerline 22. The second seal land surface 52 may be circumferentially and/or radially uninterrupted. The second seal land surface 52 of FIG. 4, for example, extends circumferentially around the axial centerline 22 and/or radially between opposing edges of the second seal land surface 52 without any breaks; e.g., apertures and/or protrusions. The present disclosure, of course, is not limited to such an exemplary second seal land surface 52. For example, in other embodiments, the second seal land surface 52 may be circumferentially and/or radially interrupted by one or more apertures; e.g., grooves, ports, etc. The second seal land surface 52 of FIGS. 2 and 4 is an annular, planar (e.g., flat) surface. The second seal land surface 52 of FIG. 2 axially faces the first seal land 34 and its first seal land surface 48.

The seal assembly 28 of FIG. 2 includes one or more seal elements 68 and 70 and one or more anti-rotation locks 72 (one visible in FIG. 2). Each of the seal elements 68, 70 may be configured as a carbon seal element. The seal assembly 28 may also include at least one spring element 74 such as, but not limited to, an annular wave spring.

The first seal element 68 of FIG. 2 may be configured as an annular full-hoop (e.g., segmented) component. The first seal element 68, for example, extends circumferentially about (e.g., completely around) the axial centerline 22; e.g., see FIG. 5. The first seal element 68 extends radially from a first seal element inner side surface 76 to a first seal element outer side surface 78. The first seal element 68 extends axially along the axial centerline 22 between a first seal element surface 80 and another surface 82 opposite the first seal element surface 80; e.g., a first seal element back surface.

Each of the first seal element side surfaces 76, 78 may be substantially cylindrical. Each of the first seal element side surfaces 76, 78 may be axially and/or circumferentially uninterrupted. The present disclosure, of course, is not limited to such exemplary first seal element side surfaces. For example, in other embodiments, one or each of the side surfaces 76, 78 may be circumferentially and/or radially interrupted by one or more apertures; e.g., grooves, ports, etc. Examples of such apertures are disclosed in U.S. Pat. No. 10,208,610, which is hereby incorporated herein by reference in its entirety.

Figure 5:
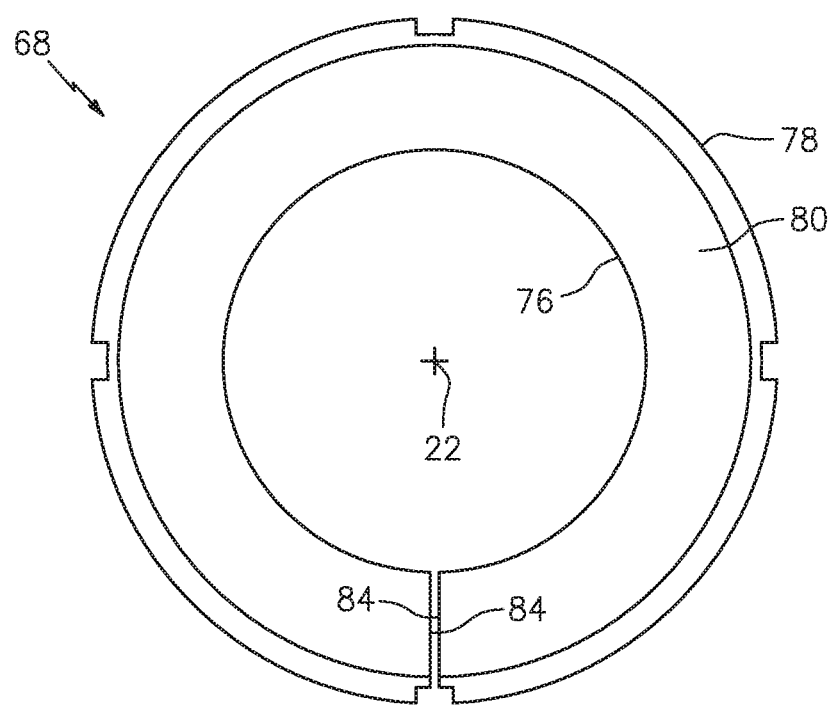
FIG. 5 is an end view illustration of a first seal element.

The first seal element surface 80 is a radially extending surface, which may be exactly or substantially (e.g., within +/−1 degree) perpendicular to the axial centerline 22. The first seal element surface 80 may be circumferentially and/or radially uninterrupted. The first seal element surface 80 of FIG. 5, for example, extends circumferentially around the axial centerline 22 and/or radially between opposing edges of the first seal element surface 80 without any breaks; e.g., apertures and/or protrusions. The present disclosure, of course, is not limited to such an exemplary first seal element surface. For example, in other embodiments, the first seal element surface 80 may be circumferentially and/or radially interrupted by one or more apertures; e.g., grooves, ports, etc. Examples of such apertures are disclosed in U.S. Pat. No. 10,208,610. Referring to FIGS. 2 and 5, the first seal element surface 80 is an annular, planar (e.g., flat) surface.

Referring again to FIG. 5, the first seal element 68 may be configured as a single monolithic body. In the specific embodiment of FIG. 5, the first seal element 68 is configured as a split ring. The first seal element 68, for example, extends circumferentially around the centerline between opposing circumferential side surfaces 84. These side surfaces 84 may define a gap/a split circumferentially therebetween in the first seal element 68, which gap/split extends axially and radially (e.g., completely) through the first seal element 68. Where the first seal element surface 80 is described as being "uninterrupted", the first seal element surface 80 is uninterrupted between the circumferentially adjacent side surfaces 84. Of course, in other embodiments, the first seal element 68 may be a full ring body; e.g., configured without a split. In still other embodiments, the first seal element 68 may alternatively be configured from a plurality of first seal element segments (e.g., circumferentially/arcuate segments) arranged circumferentially around the axial centerline 22 in an annular array.

The second seal element 70 of FIG. 2 may be configured as an annular full-hoop (e.g., segmented) component. The second seal element 70, for example, extends circumferentially about (e.g., completely around) the axial centerline 22; e.g., see FIG. 6. The second seal element 70 extends radially from a second seal element inner side surface 86 to a second seal element outer side surface 88. The second seal element 70 extends axially along the axial centerline 22 between a second seal element surface 90 and another surface 92 opposite the second seal element surface 90; e.g., a second seal element back surface.

Each of the second seal element side surfaces 86 and 88 may be substantially cylindrical. Each of the second seal element side surfaces 86 and 88 may be axially and/or circumferentially uninterrupted. The present disclosure, of course, is not limited to such exemplary second seal element side surfaces. For example, in other embodiments, one or each of the side surfaces 86, 88 may be circumferentially and/or radially interrupted by one or more apertures; e.g., grooves, ports, etc. Examples of such apertures are disclosed in U.S. Pat. No. 10,208,610.

Figure 6:
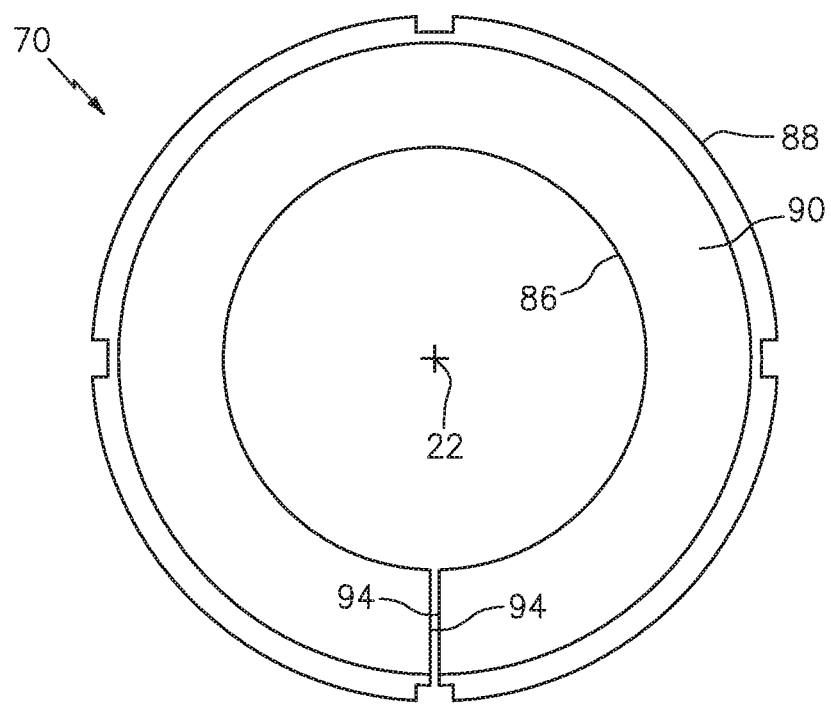
FIG. 6 is an end view illustration of a second seal element.

The second seal element surface 90 is a radially extending surface, which may be exactly or substantially (e.g., within +/−1 degree) perpendicular to the axial centerline 22. The second seal element surface 90 may be circumferentially and/or radially uninterrupted. The second seal element surface 90 of FIG. 6, for example, extends circumferentially around the axial centerline 22 and/or radially between opposing edges of the second seal element surface 90 without any breaks; e.g., apertures and/or protrusions. The present disclosure, of course, is not limited to such an exemplary second seal element surface 90. For example, in other embodiments, the second seal element surface 90 may be circumferentially and/or radially interrupted by one or more apertures; e.g., grooves, ports, etc. Examples of such apertures are disclosed in U.S. Pat. No. 10,208,610. Referring to FIGS. 2 and 6, the second seal element surface 90 is an annular, planar (e.g., flat) surface.

Referring again to FIG. 6, the second seal element 70 may be configured as a single monolithic body. In the specific embodiment of FIG. 6, the second seal element 70 is configured as a split ring. The second seal element 70, for example, extends circumferentially around the centerline between opposing circumferential side surfaces 94. These side surfaces 94 may define a gap/a split circumferentially therebetween in the second seal element 70, which gap/split extends axially and radially (e.g., completely) through the second seal element 70. Where the second seal element surface 90 is described as being "uninterrupted", the second seal element surface 90 is uninterrupted between the circumferentially adjacent side surfaces 94. Of course, in other embodiments, the second seal element 70 may be a full ring body; e.g., configured without a split. In still other embodiments, the second seal element 70 may alternatively be configured from a plurality of second seal element segments (e.g., circumferentially/arcuate segments) arranged circumferentially around the axial centerline 22 in an annular array.

Referring again to FIG. 2, the seal elements 68 and 70 are arranged within an annular cavity 96. This cavity 96 extends axially between the first seal land surface 48 and the second seal land surface 52. The cavity 96 extends radially between the first and/or the second bases 38 and 54 and the stationary structure inner surface 30.

Figure 7:
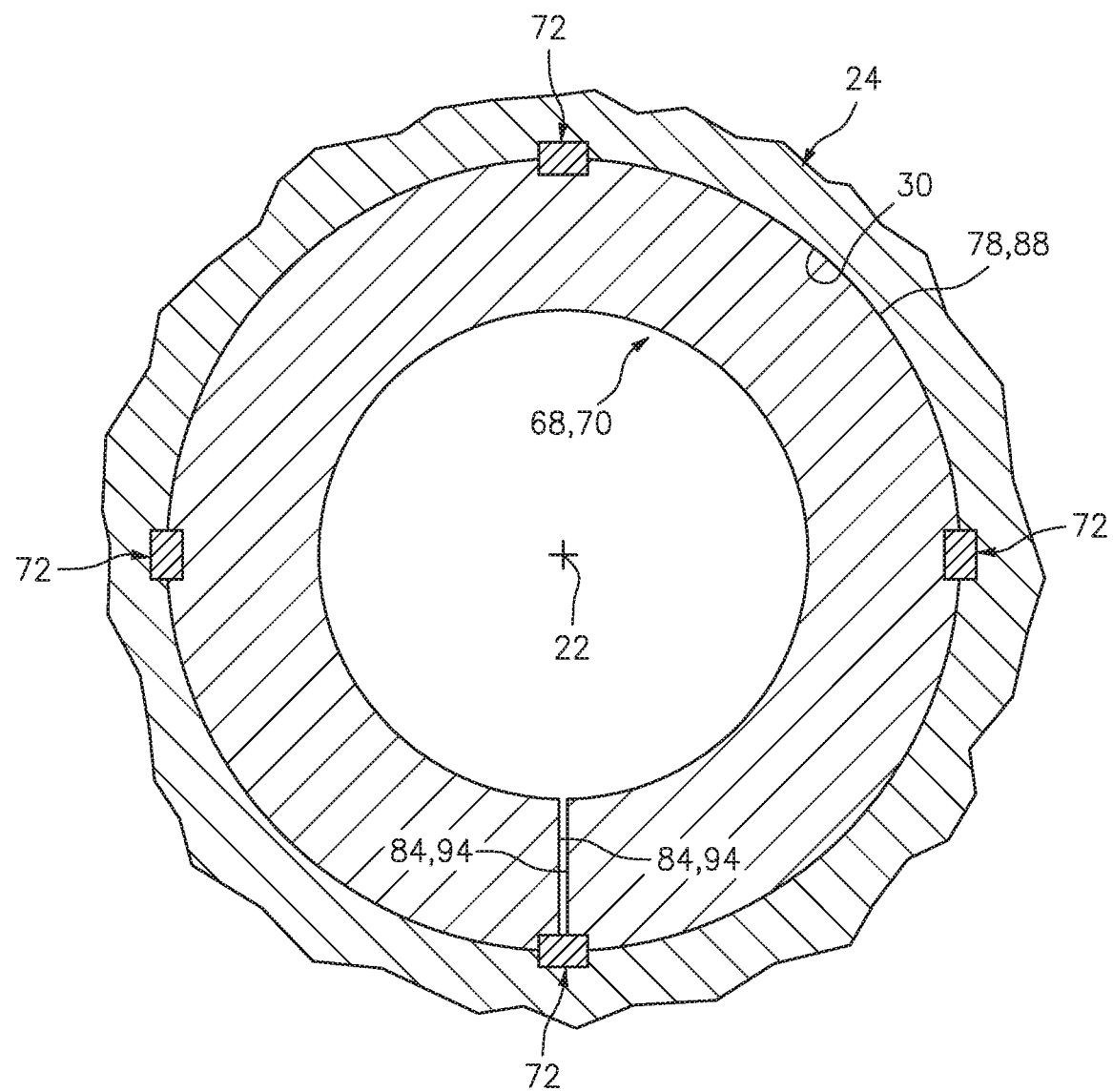
FIG. 7 is a cross-sectional illustration of a seal element nested within a bore of a stationary structure.

The first seal element 68 is arranged adjacent the first seal land 34 and the stationary structure 24. The first seal element 68, for example, is configured to sealingly engage (e.g., contact) the first seal land surface 48 and the stationary structure inner surface 30 (see FIG. 7). In the specific embodiment of FIG. 2, the first seal element surface 80 axially sealingly engages the first seal land surface 48; e.g., the surface 80 contacts the surface 48 in an axial direction along the axial centerline 22. Referring to FIG. 7, the first seal element outer side surface 78 radially sealingly engages the stationary structure inner surface 30; e.g., the surface 78 contacts the surface 30 in a radial direction relative to the axial centerline 22.

Referring to FIG. 2, the second seal element 70 is arranged adjacent the second seal land 36 and the stationary structure 24. The second seal element 70, for example, is configured to sealingly engage (e.g., contact) the second seal land surface 52 and the stationary structure inner surface 30 (see FIG. 7). In the specific embodiment of FIG. 2, the second seal element surface 90 axially sealingly engages the second seal land surface 52; e.g., the surface 90 contacts the surface 52 in an axial direction along the axial centerline 22. Referring to FIG. 7, the second seal element outer side surface 88 radially sealingly engages the stationary structure inner surface 30; e.g., the surface 88 contacts the surface 30 in a radial direction relative to the axial centerline 22.

Referring to FIG. 2, the spring element 74 is arranged in a gap axially between the first seal element 68 and the second seal element 70. This spring element 74 is configured to axially engage (e.g., contact) the first seal element back surface 82 and the second seal element back surface 92; e.g., see dashed lines 74A and 74B depicting the spring element 74 at other circumferential positions about the centerline 22. The spring element 74 may thereby bias (e.g., push) the first seal element 68 axially towards/against the first seal land 34. Similarly, the spring element 74 may bias (e.g., push) the second seal element 70 axially towards/against the second seal land 36.

During operation of the rotational equipment, the rotating structure 26 and, thus, the seal elements 68 and 70 rotate about the axial centerline 22; e.g., its rotational axis. Under certain circumstances, without the anti-rotation locks 72, rubbing frictional forces (A) between the first seal land 34 and the first seal element 68 and/or (B) between the second seal land 36 and the second seal element 70 may respectively cause one or both of the seal elements 68 and 70 to rotate about the axial centerline 22. Such rubbing frictional forces may even cause rotation of one or both of the seal elements 68 and 70 where each seal element 68, 70 has an interference fit with the stationary structure 24; e.g., between the surfaces 30 and 78, 88 (see FIG. 7). Such rotation of the seal elements 68 and 70 may cause wear to the stationary structure 24 and, more particularly, may wear away/degrade the stationary structure inner surface 30. To prevent such rotation, the seal assembly 28 includes the one or more anti-rotation locks 72. In particular, the anti-rotation locks 72 are configured (individually and/or in combination) to at least substantially or completely prevent rotation of one or more of the seal elements 68 and 70 about the axial centerline 22 and relative to the stationary structure 24. For example, the anti-rotation locks 72 may prevent more than a certain amount (e.g., 1-2 degrees) of rotation about the axial centerline 22, or may alternatively prevent any rotation about the axial centerline 22.

Referring to FIG. 7, the anti-rotation locks 72 may be arranged circumferentially about the axial centerline 22. A first of the anti-rotation locks 72 may be configured at the gap/split defined between the side surfaces 84, 94. The present disclosure, however, is not limited to such an exemplary placement.

Figure 9:
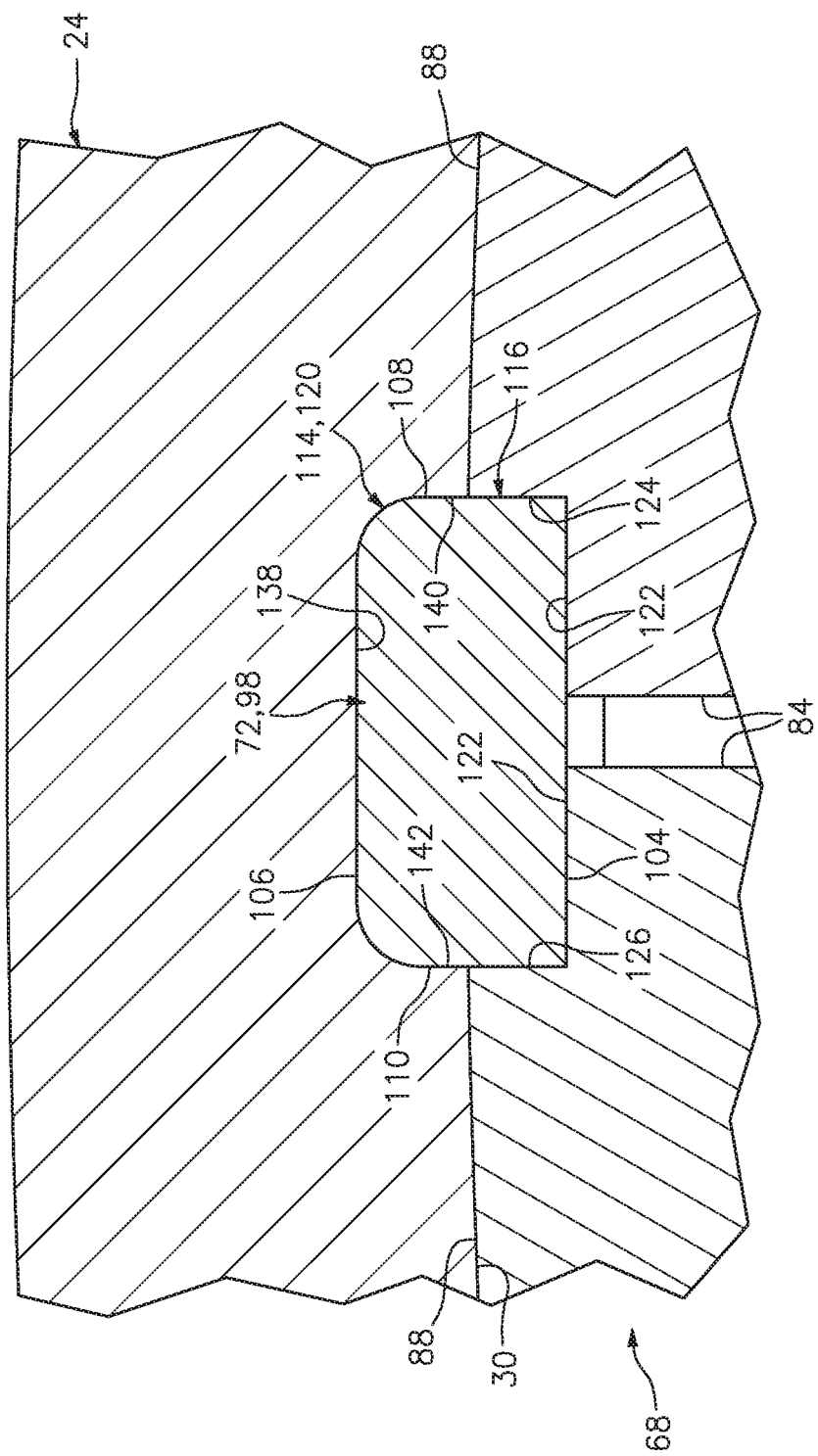
FIG. 9 is a cross-sectional illustration of a portion of the seal assembly of FIG. 8 taken along line 9-9.
Figure 10:
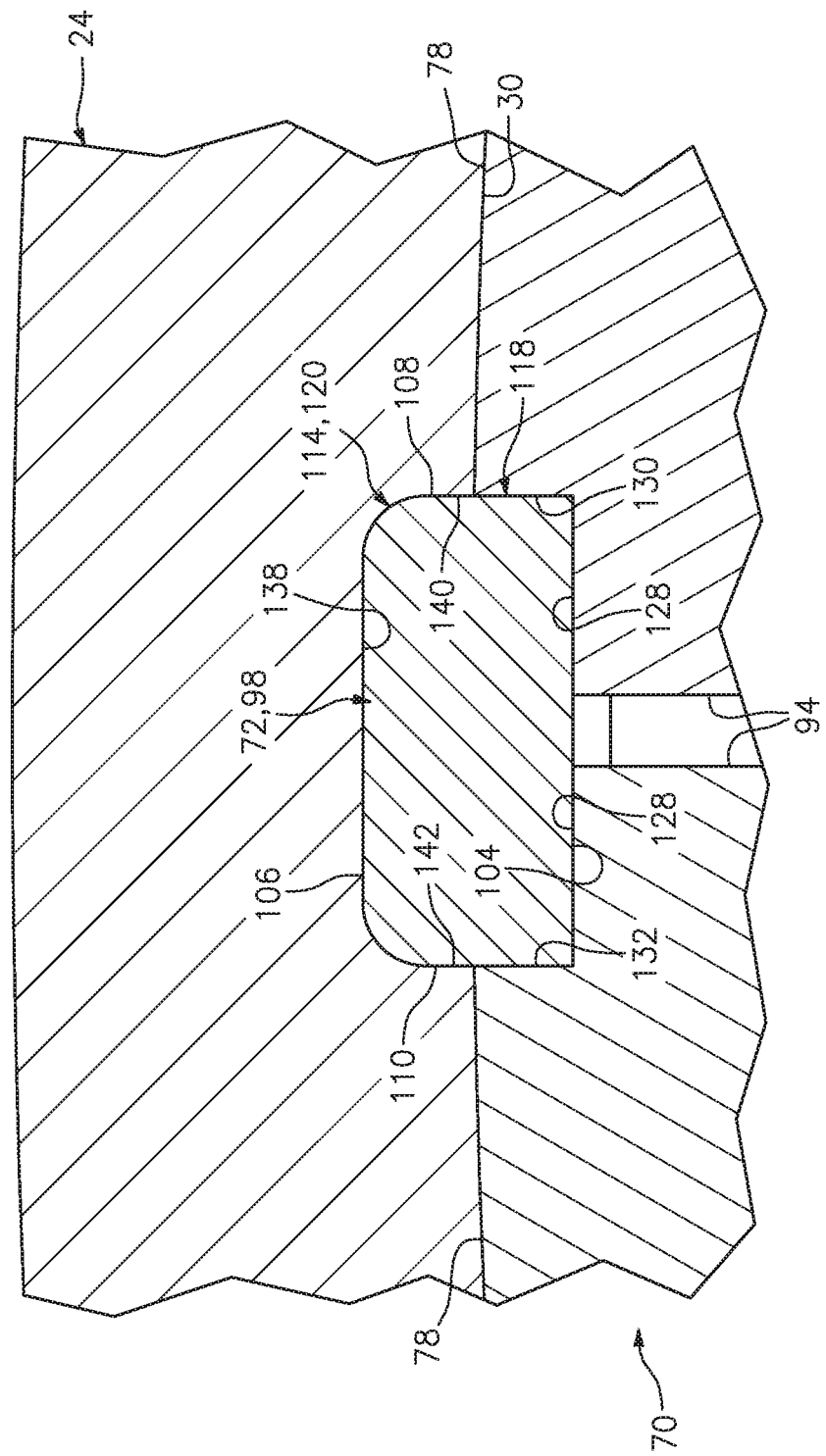
FIG. 10 is a cross-sectional illustration of a portion of the seal assembly of FIG. 8 taken along line 10-10.
Figure 11:
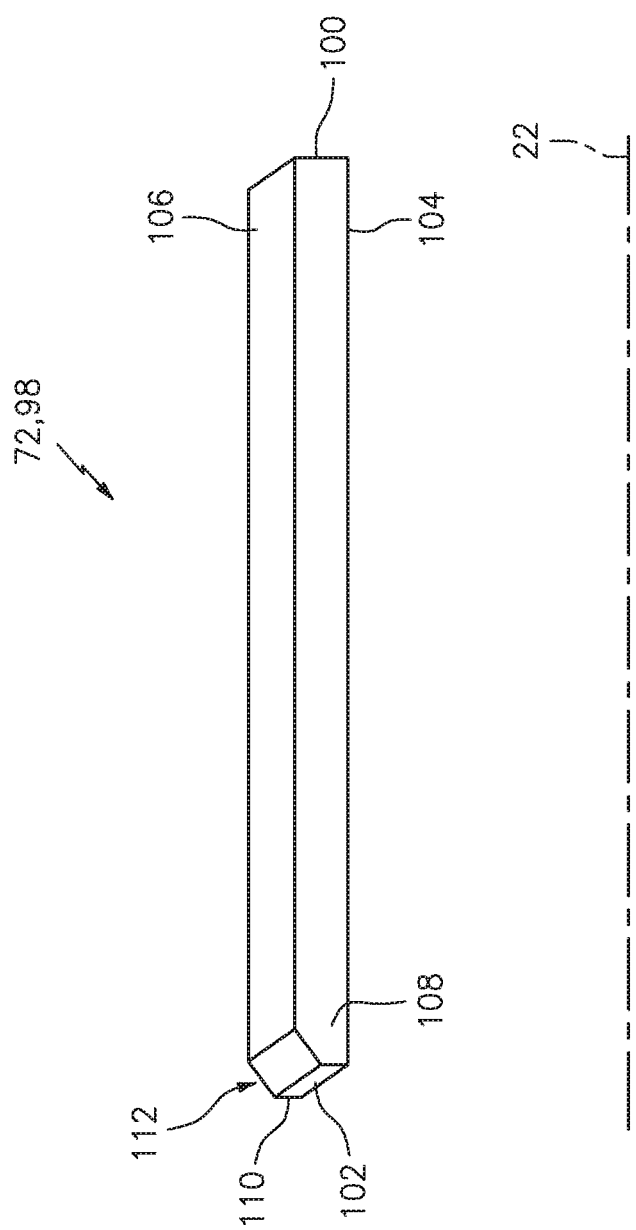
FIG. 11 is a perspective illustration of the anti-rotation lock key.

FIGS. 8-11 illustrate an exemplary embodiment of one of the anti-rotation locks 72. This anti-rotation lock 72 is configured as a key 98. Referring to FIG. 11, the key 98 extends axially along the axial centerline 22 between opposing axial key ends 100 and 102. The key 98 extends radially between opposing radial key sides 104 and 106. The key 98 extends laterally (e.g., circumferentially or tangentially) between opposing lateral key sides 108 and 110.

Figure 8:
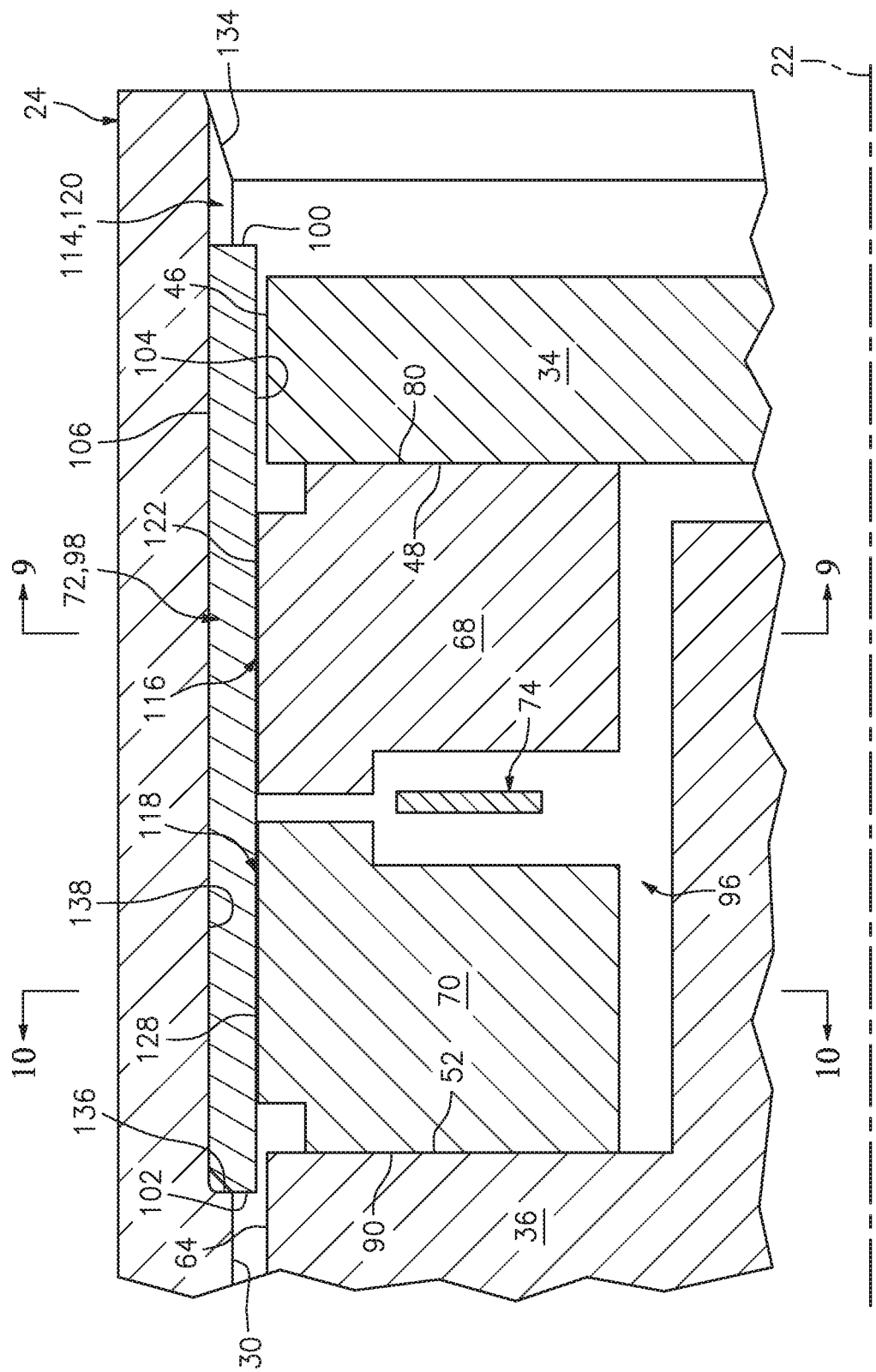
FIG. 8 is a partial side sectional illustration of a seal assembly with an anti-rotation lock key.

The key 98 may have a polygonal (e.g., substantially rectangular) cross-sectional geometry when viewed, for example, in a plane perpendicular to the axial centerline 22; e.g., see plane of FIGS. 9 and 10. The key 98 may also or alternatively have a polygonal (e.g., substantially rectangular) side sectional geometry when viewed, for example, in a plane parallel with and coincident with the axial centerline 22; e.g., see plane of FIG. 8.

The key 98 of FIG. 11 includes a (e.g., outer) chamfered edge 112 at, for example, the second axial key end 102. This chamfered edge 112 may facilitate installation of the key 98 into a keyway 114 formed by the stationary structure 24 and the seal assembly 28; see FIGS. 8-10.

Referring to FIG. 8, the keyway 114 includes one or more channels 116 and 118 in the seal assembly 28 as well as a channel 120 in the stationary structure 24. The first channel 116 extends axially along the axial centerline 22 into and through the first seal element 68. Referring to FIG. 9, the first channel 116 extends radially into the first seal element 68 from the first seal element outer side surface 78 to one or more first channel bottom surfaces 122. The first channel 116 extends laterally (e.g., circumferentially or tangentially) within the first seal element 68 between opposing first channel side surfaces 124 and 126.

A first of the first channels 116 may be located at the gap/split between the side surfaces 84. For example, the first channel 116 of FIG. 9 is formed by notches in the first seal element 68. Each notch of FIG. 9 is formed by a respective one of the first channel bottom surfaces 122 and a respective one of the first channel side surfaces 124, 126.

Referring to FIG. 8, the second channel 118 extends axially along the axial centerline 22 into and through the second seal element 70. Referring to FIG. 10, the second channel 118 extends radially into the second seal element 70 from the second seal element outer side surface 88 to one or more second channel bottom surfaces 128. The second channel 118 extends laterally (e.g., circumferentially or tangentially) within the second seal element 70 between opposing second channel side surfaces 130 and 132.

A first of the second channels 118 may be located at the gap/split between the side surfaces 94. For example, the second channel 118 of FIG. 10 is formed by notches in the second seal element 70. Each notch of FIG. 10 is formed by a respective one of the second channel bottom surfaces 128 and a respective one of the first channel side surfaces 130, 132.

Referring to FIG. 8, the stationary structure channel 120 extends axially along the axial centerline 22 into the stationary seal element from an edge surface 134 to stationary structure channel end surface 136. The stationary structure channel 120 extends radially into the stationary structure 24 from the stationary structure inner surface 30 to a stationary structure channel bottom surface 138. Referring to FIGS. 9 and 10, the stationary structure channel 120 extends laterally (e.g., circumferentially or tangentially) within the stationary structure 24 between opposing stationary structure channel side surfaces 140 and 142.

Referring to FIGS. 8-10, the key 98 is inserted into the keyway 114 such that the key 98 engages the first seal element 68, the second seal element 70 and the stationary structure 24. The key 98 may thereby bridge the gap/split between the side surfaces 84, 94 (see FIGS. 9 and 10); e.g., a joint between opposing circumferential sides of the seal element 68, 70. The key 98 may also be in a gap between the stationary structure 24 and the seal land 34, 36. More particularly, the key 98 projects radially into the first channel 116, radially into the second channel 118 and radially into the stationary structure channel 120. Referring to FIGS. 9 and 10, the lateral key side 108 laterally engages (e.g., contacts) the channel side surfaces 124, 130 and 140. The lateral key side 110 laterally engages (e.g., contacts) the channel side surfaces 126, 132 and 142. The key 98 is thereby operable to prevent (or limit) rotation of the first seal element 68 and the second seal element 70.

While the key 98 is operable to prevent or otherwise limit rotation of the seal element(s) 68, 70, the key 98 may also be configured to enable axial movement of the seal element (s) 68, 70. For example, the first seal element 68 and/or the second seal element 70 may slide axially along the key 98 during rotational equipment operation.

Figure 12:
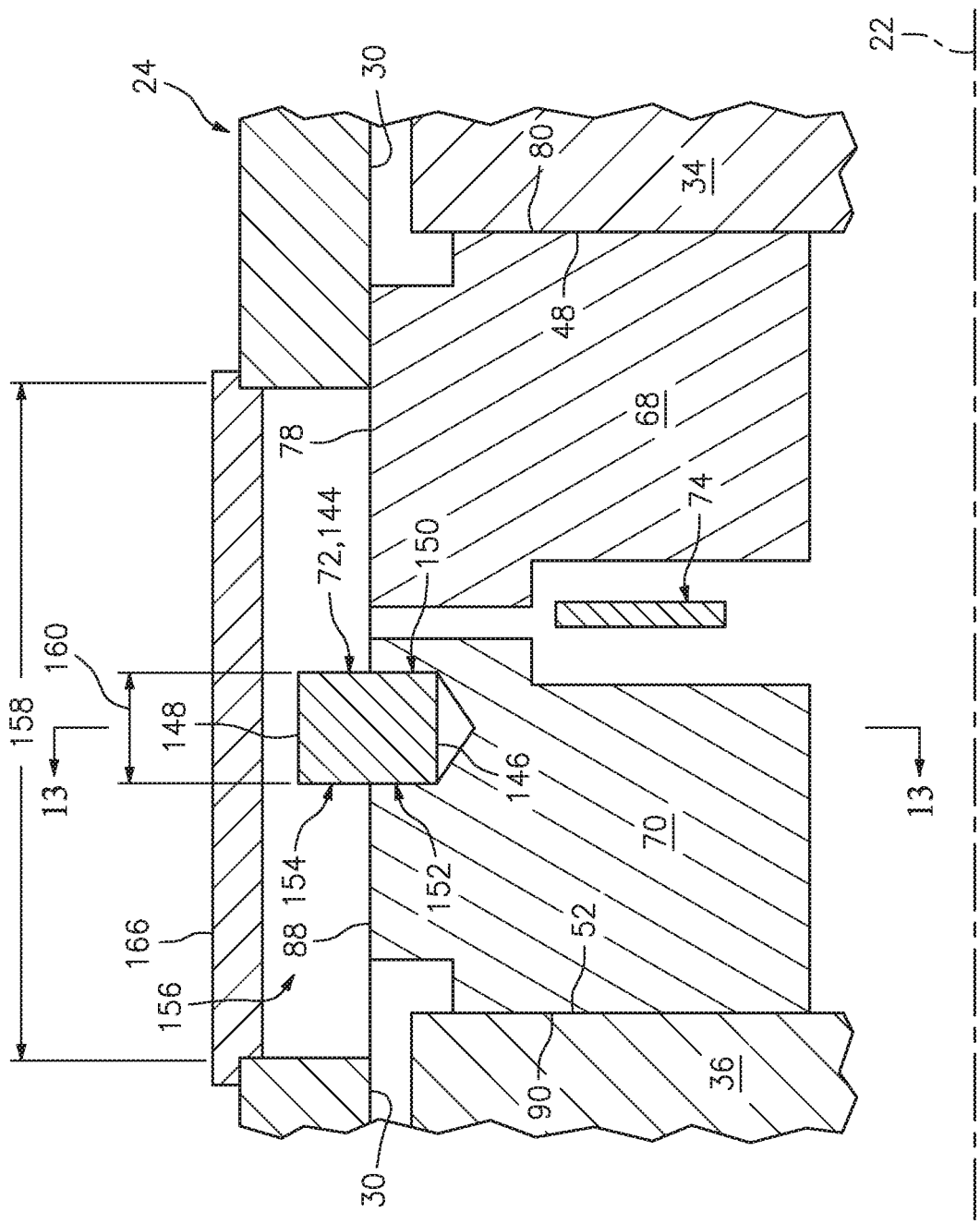
FIG. 12 is a partial side sectional illustration of a seal assembly with an anti-rotation lock pin.
Figure 13:
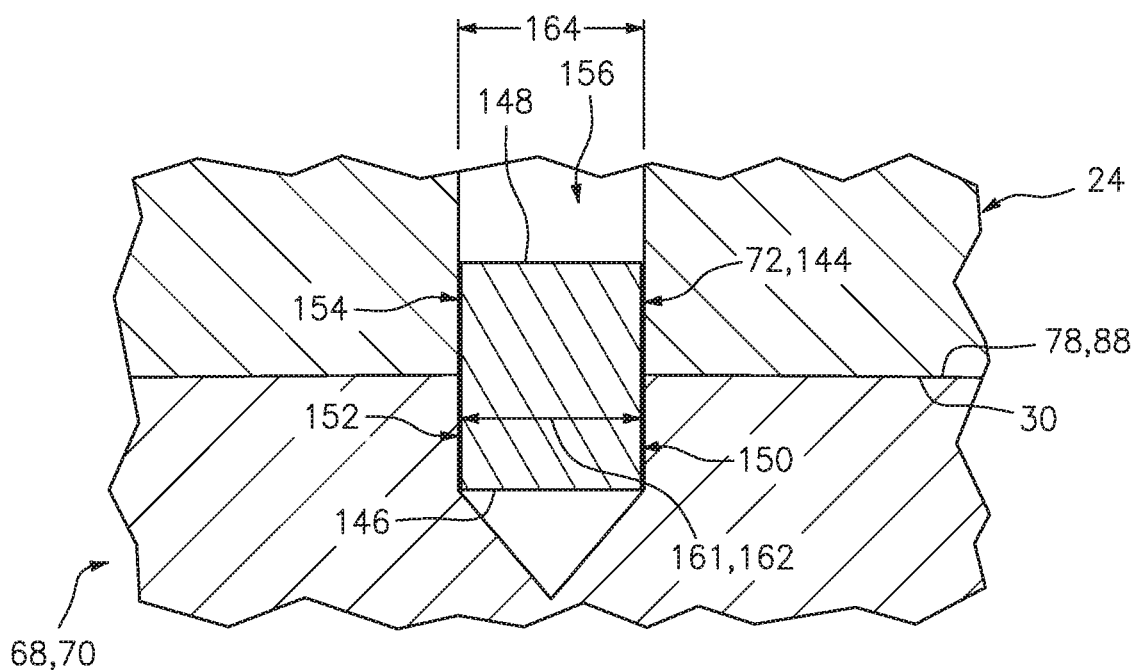
FIG. 13 is cross-sectional illustration of a portion of the seal assembly of FIG. 12 taken along line 13-13.

FIGS. 12 and 13 illustrate another exemplary embodiment of one of the anti-rotation locks 72. This anti-rotation lock 72 is configured as a pin 144. The pin 144 may be a cylindrical body that extends longitudinally along a longitudinal axis of the pin 144 between opposing (e.g., circular) pin ends 146 and 148. An inner portion 150 of the pin 144 projects into an aperture 152 in one of the seal elements 68, 70 (e.g., the first seal element 68 in FIGS. 12 and 13). An outer portion 154 of the pin 144 projects into a slot 156 in the stationary structure 24. Referring to FIG. 12, the slot 156 has an axial width 158 that is greater than an axial width 160 (e.g., diameter) of the pin 144. With such an arrangement, the pin 144 may move axially through the slot 156 and thereby enable axial movement of the respect seal element 68, 70 along the axial centerline 22. However, referring to FIG. 13, a lateral width 161 (e.g., diameter 160) of the pin 144 may be sized substantially equal to or slightly less than a lateral width 162 (e.g., diameter) of the aperture 152 and/or a lateral width 164 of the slot 156. Thus, the pin 144 may prevent or otherwise limit rotation of the seal element 68, 70 about the axial centerline 22.

In some embodiments, the stationary structure 24 may include a slot cap 166 to close off an outer opening to the slot 156 as shown in FIG. 12.

The pin 144 is shown in FIGS. 12 and 13 as engaging the first seal element 68. The pin 144 may alternatively, however, engage the second seal element 70 in the same manner as described above with respect to the first seal element 68. Furthermore, in some embodiments, each seal element 68, 70 may engage and be associated with a respective pin 144.

Figure 14:
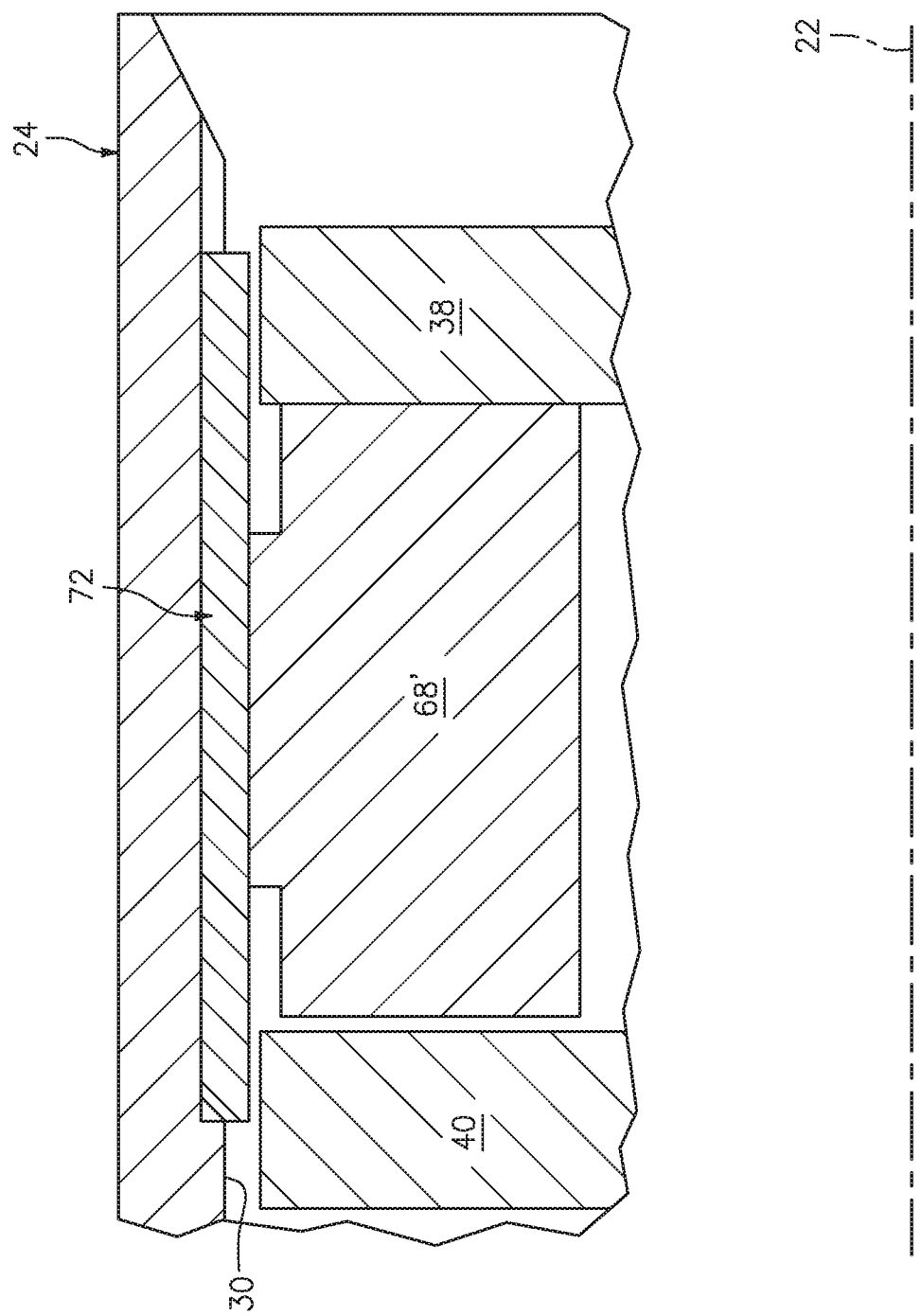
FIG. 14 is a partial side sectional illustration of another seal assembly between the stationary structure and the rotating structure.

In some embodiments, the seal assembly 28 may be configured with a single seal element 68' as shown, for example, in FIG. 14.

Figure 15:
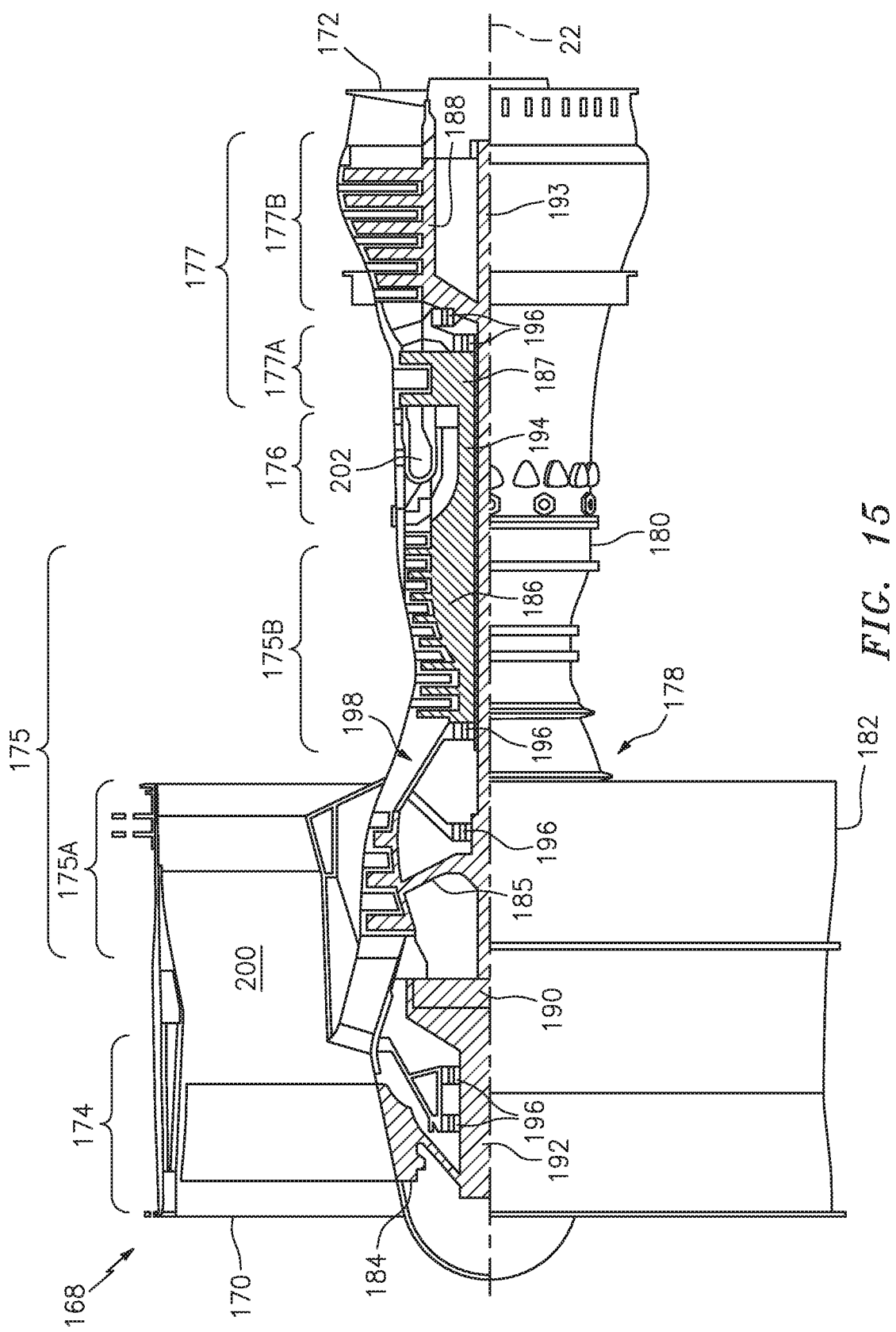
FIG. 15 is a side cutaway illustration of a geared turbine engine.

FIG. 15 is a side cutaway illustration of a geared turbine engine 168 with which the assembly 20 of FIG. 1 may be configured. The turbine engine 168 extends along the axial centerline 22 between an upstream airflow inlet 170 and a downstream airflow exhaust 172. The turbine engine 168 includes a fan section 174, a compressor section 175, a combustor section 176 and a turbine section 177. The compressor section 175 includes a low pressure compressor (LPC) section 175A and a high pressure compressor (HPC) section 175B. The turbine section 177 includes a high pressure turbine (HPT) section 177A and a low pressure turbine (LPT) section 177B.

The engine sections 174-177 are arranged sequentially along the centerline 22 within an engine housing 178. This housing 178 includes an inner case 180 (e.g., a core case) and an outer case 182 (e.g., a fan case). The inner case 180 may house one or more of the engine sections 175-177; e.g., an engine core. The inner case 180 may include the stationary structure 24 (see FIG. 1). The outer case 182 may house at least the fan section 174.

Each of the engine sections 174, 175A, 175B, 177A and 177B includes a respective rotor 184-188. Each of these rotors 184-188 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 184 is connected to a gear train 190, for example, through a fan shaft 192. The gear train 190 and the LPC rotor 185 are connected to and driven by the LPT rotor 188 through a low speed shaft 193. The HPC rotor 186 is connected to and driven by the HPT rotor 187 through a high speed shaft 194. One of these shafts 192-194 may be configured as the shaft 32 (see FIG. 1). The shafts 192-194 are rotatably supported by a plurality of bearings 196; e.g., rolling element and/or thrust bearings. Each of these bearings 196 is connected to the engine housing 178 by at least one stationary structure such as, for example, an annular support strut.

During operation, air enters the turbine engine 168 through the airflow inlet 170. This air is directed through the fan section 174 and into a core gas path 198 and a bypass gas path 200. The core gas path 198 extends sequentially through the engine sections 175-177B. The air within the core gas path 198 may be referred to as "core air". The bypass gas path 200 extends through a bypass duct, which bypasses the engine core. The air within the bypass gas path 200 may be referred to as "bypass air".

The core air is compressed by the compressor rotors 185 and 186 and directed into a combustion chamber 202 of a combustor in the combustor section 176. Fuel is injected into the combustion chamber 202 and mixed with the compressed core air to provide a fuel-air mixture. This fuel air mixture is ignited and combustion products thereof flow through and sequentially cause the turbine rotors 187 and 188 to rotate. The rotation of the turbine rotors 187 and 188 respectively drive rotation of the compressor rotors 186 and 185 and, thus, compression of the air received from a core airflow inlet. The rotation of the turbine rotor 188 also drives rotation of the fan rotor 184, which propels bypass air through and out of the bypass gas path 200. The propulsion of the bypass air may account for a majority of thrust generated by the turbine engine 168, e.g., more than seventy-five percent (75%) of engine thrust. The turbine engine 168 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 15), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a stationary structure;
a rotating structure rotatable about an axis and comprising a seal land;
a seal element configured to seal a gap between the stationary structure and the seal land, the seal element extending circumferentially about the axis, and the seal element axially contacting the seal land; and
an anti-rotation lock projecting radially into the stationary structure and the seal element, the anti-rotation lock configured to at least substantially prevent rotation of the seal element relative to the stationary structure, the anti-rotation lock comprising a key, and the key arranged in a channel that extends axially through the seal element.

2. The assembly of claim 1, wherein the key projects axially into a second gap formed by and radially between the seal element and the stationary structure.

3. The assembly of claim 1, wherein the anti-rotation lock is further configured to enable axial movement of the seal element relative to the stationary structure.

4. The assembly of claim 1, wherein the seal element radially contacts the stationary structure.

5. The assembly of claim 1, wherein the seal element comprises an annular carbon seal element.

6. The assembly of claim 1, further comprising a spring element configured to bias the seal element axially against the seal land.

7. The assembly of claim 1, further comprising a second seal element configured to seal a gap between the stationary structure and a second seal land, the second seal element extending circumferentially about the axis, and the second seal element axially contacting the second seal land.

8. The assembly of claim 7, further comprising a spring element arranged axially between the seal element and the second seal element, the spring element configured to bias the seal element axially against the seal land, and the spring element further configured to bias the second seal element axially against the second seal land.

9. The assembly of claim 7, wherein the anti-rotation lock is further configured to at least substantially prevent rotation of the second seal element relative to the stationary structure.

10. The assembly of claim 7, wherein the anti-rotation lock further projects radially into the second seal element.

11. The assembly of claim 7, further comprising a second anti-rotation lock projecting radially into the stationary structure and the second seal element, the second anti-rotation lock configured to at least substantially prevent rotation of the second seal element relative to the stationary structure.

12. An assembly for rotational equipment, comprising:
a stationary structure;
a rotating structure rotatable about an axis and comprising a seal land;
a seal element configured to seal a gap between the stationary structure and the seal land, the seal element extending circumferentially about the axis, and the seal element axially contacting the seal land; and
an anti-rotation lock projecting radially into the stationary structure and the seal element, the anti-rotation lock configured to at least substantially prevent rotation of the seal element relative to the stationary structure;
wherein the seal element is configured as a split ring that extends circumferentially about the axis between opposing side surfaces that are respectively located at circumferential ends of the split ring; and
wherein the anti-rotation lock bridges a gap formed between the side surfaces.

* * * * *